US006630751B2

(12) United States Patent
Curtis et al.

(10) Patent No.: US 6,630,751 B2
(45) Date of Patent: Oct. 7, 2003

(54) EXCESSIVE LOAD CAPACITOR DETECTION CIRCUIT FOR UPS

(75) Inventors: Jeffrey Curtis, Dunstable, MA (US); David E. Reilly, Concord, MA (US); Kevin White, Haverhill, MA (US); Namwook Paik, Acton, MA (US)

(73) Assignee: American Power Conversion, West Kingston, RI (US)

( * ) Notice: Subject to any disclaimer, the term of this patent is extended or adjusted under 35 U.S.C. 154(b) by 319 days.

(21) Appl. No.: 09/811,894

(22) Filed: Mar. 19, 2001

(65) Prior Publication Data

US 2002/0030411 A1 Mar. 14, 2002

Related U.S. Application Data

(63) Continuation-in-part of application No. 09/311,043, filed on May 13, 1999, now Pat. No. 6,404,658.

(51) Int. Cl.$^7$ ................................ H02M 7/00
(52) U.S. Cl. ........................ 307/64; 363/98; 324/679
(58) Field of Search ................ 363/132, 98; 307/64, 307/66, 125; 324/519, 548, 658, 679, 680, 686

(56) References Cited

U.S. PATENT DOCUMENTS

| | | |
|---|---|---|
| 4,115,704 A | 9/1978 | Hannemann et al. |
| 4,305,033 A | 12/1981 | Powell |
| 4,473,756 A | 9/1984 | Brigden et al. |
| 4,517,470 A | 5/1985 | Cheffer |
| 4,717,998 A | 1/1988 | Cheron et al. |
| 4,827,150 A | 5/1989 | Reynal |
| 4,916,599 A | 4/1990 | Traxler et al. |

(List continued on next page.)

FOREIGN PATENT DOCUMENTS

| | | |
|---|---|---|
| EP | 0 420 628 A2 | 4/1991 |
| EP | 0 696 831 A2 | 2/1996 |

OTHER PUBLICATIONS

*Liberman, D., "Technology: El design yields brighter display at lower power". Electronic Engineering Times (Aug. 17, 1998).
*Mohan, et al., "Power Electronics: Converters, Applications and Design", John Wiley & Sons (NY) (1989).

Primary Examiner—Brian Sircus
Assistant Examiner—Roberto J. Rios
(74) Attorney, Agent, or Firm—Mintz, Levin, Cohn, Ferris, Glovsky and Popeo, P.C.

(57) ABSTRACT

Embodiments of the present invention are directed to an uninterruptible power supply for providing AC power to a load having a capacitive element. In embodiments of the present invention the uninterruptible power supply includes an input to receive AC power from an AC power source, an output that provides AC power, a DC voltage source that provides DC power, the DC voltage source having an energy storage device, an inverter operatively coupled to the DC voltage source to receive DC power and to provide AC power, the inverter including: first and second output nodes to provide AC power to the load having the first capacitive element, first and second input nodes to receive DC power from the DC voltage source, a circuit operatively coupled to the first output node of the inverter, the circuit being configured to compare a value representative of load capacitance of the first capacitive element with a reference value to determine excessive load capacitance, a set of switches operatively coupled between the first and second output nodes and the first and second input nodes and controlled to generate AC power from the DC power, and a transfer switch constructed and arranged to select one of the AC power source and the DC voltage source as an output power source for the uninterruptible power supply.

14 Claims, 14 Drawing Sheets

U.S. PATENT DOCUMENTS

| | | | |
|---|---|---|---|
| 4,939,633 A | | 7/1990 | Rhodes et al. |
| 5,010,469 A | | 4/1991 | Bobry |
| 5,045,989 A | * | 9/1991 | Higaki et al. .................. 363/97 |
| 5,251,121 A | | 10/1993 | Knodle et al. |
| 5,274,540 A | * | 12/1993 | Maehara ..................... 363/132 |
| 5,347,164 A | | 9/1994 | Yeh |
| 5,488,552 A | | 1/1996 | Sakamoto et al. |
| 5,513,088 A | | 4/1996 | Williamson |
| 5,517,403 A | * | 5/1996 | Maehara ..................... 363/132 |
| 5,525,869 A | * | 6/1996 | Wood ..................... 315/169.3 |
| 5,557,175 A | * | 9/1996 | Wood ..................... 315/200 R |
| 5,561,595 A | | 10/1996 | Smith |
| 5,563,777 A | | 10/1996 | Miki et al. |
| 5,563,778 A | | 10/1996 | Oh |
| 5,602,462 A | | 2/1997 | Stich et al. |
| 5,610,805 A | * | 3/1997 | Gupta ........................ 307/66 |
| 5,635,773 A | | 6/1997 | Stuart |
| 5,646,835 A | | 7/1997 | Katcha |
| 5,680,301 A | | 10/1997 | Oughton, Jr. et al. |
| 5,686,797 A | * | 11/1997 | Sanderson ............. 315/209 R |
| 5,175,155 A | | 2/1998 | Shahani et al. |
| 5,734,565 A | | 3/1998 | Mueller et al. |
| 5,760,495 A | | 6/1998 | Mekanik |
| 5,774,351 A | | 6/1998 | Hsieh et al. |
| 5,781,399 A | | 7/1998 | Lanigan et al. |
| 5,784,270 A | | 7/1998 | Permuy |
| 5,953,224 A | * | 9/1999 | Gold et al. .................... 363/98 |
| 6,111,606 A | * | 8/2000 | Ikeda ........................ 348/241 |
| 6,175,155 A | * | 2/2001 | Yabuuchi et al. ........... 323/222 |
| 6,278,245 B1 | * | 8/2001 | Li et al. ....................... 363/98 |
| 6,343,021 B1 | * | 1/2002 | Williamson ................ 363/163 |
| 6,353,337 B2 | * | 3/2002 | Nasu et al. ................. 324/679 |
| 6,404,658 B1 | * | 6/2002 | Reilly ........................ 363/125 |
| 6,532,160 B2 | * | 3/2003 | Hirokawa et al. ............ 363/88 |

* cited by examiner

EXCESSIVE LOAD CAPACITOR DETECTION CIRCUIT FOR UPS

CROSS REFERENCE TO RELATED APPLICATIONS

This application is a continuation in part of application Ser. No. 09/311,043 titled "Method and Apparatus for Converting a DC Voltage to an AC Voltage," filed on May 13, 1999, now U.S. Pat. No. 6,404,658 which is incorporated herein by reference.

This application is related to an application titled "Method and Apparatus for Converting a DC Voltage to an AC Voltage," filed on Mar. 19, 2001, which is incorporated herein by reference.

FIELD OF THE INVENTION

Embodiments of the present invention are directed generally to a method and an apparatus for converting a DC voltage to an AC voltage. More specifically, embodiments of the present invention are directed to methods and apparatus for detecting excessive capacitance in a load when converting DC voltages to AC voltages using inverter circuits in devices such as uninterruptible power supplies (UPS).

BACKGROUND OF THE INVENTION

The use of uninterruptible power supplies (UPSs) having battery back-up systems to provide regulated, uninterrupted power for sensitive and/or critical loads, such as computer systems, and other data processing systems is well known. FIG. 1 shows a typical prior art UPS 10 used to provide regulated uninterrupted power. The UPS 10 includes an input filter/surge protector 12, a transfer switch 14, a controller 16, a battery 18, a battery charger 19, an inverter 20, and a DC—DC converter 23. The UPS also includes an input 24 for coupling to an AC power source and an outlet 26 for coupling to a load.

The UPS 10 operates as follows. The filter/surge protector 12 receives input AC power from the AC power source through the input 24, filters the input AC power and provides filtered AC power to the transfer switch and the battery charger. The transfer switch 14 receives the AC power from the filter/surge protector 12 and also receives AC power from the inverter 20. The controller 16 determines whether the AC power available from the filter/surge protector is within predetermined tolerances, and if so, controls the transfer switch to provide the AC power from the filter/surge protector to the outlet 26. If the input AC power to the UPS is not within the predetermined tolerances, which may occur because of "brown out," "high line," or "black out" conditions, or due to power surges, then the controller controls the transfer switch to provide the AC power from the inverter 20. The DC—DC converter 23 is an optional component that converts the output of the battery to a voltage that is compatible with the inverter. Depending on the particular inverter and battery used the inverter may be operatively coupled to the battery either directly or through a DC—DC converter.

The inverter 20 of the prior art UPS 10 receives DC power from the DC—DC converter 23, converts the DC voltage to AC voltage, and regulates the AC voltage to predetermined specifications. The inverter 20 provides the regulated AC voltage to the transfer switch. Depending on the capacity of the battery and the power requirements of the load, the UPS 10 can provide power to the load during brief power source "dropouts" or for extended power outages.

In typical medium power, low cost inverters, such as inverter 20 of UPS 10, the waveform of the AC voltage has a rectangular shape rather than a sinusoidal shape. A typical prior art inverter circuit 100 is shown in FIG. 2 coupled to a DC voltage source 18a and coupled to a typical load 126 comprising a load resistor 128 and a load capacitor 130. The DC voltage source 18a may be a battery, or may include a battery 18 coupled to a DC—DC converter 23 and a capacitor 25 as shown in FIG. 2A. Typical loads have a capacitive component due to the presence of an EMI filter in the load. The inverter circuit 100 includes four switches S1, S2, S3 and S4. Each of the switches is implemented using power MOSFET devices which consist of a transistor 106, 112, 118, 124 having an intrinsic diode 104, 110, 116, and 122. Each of the transistors 106, 112, 118 and 124 has a gate, respectively 107, 109, 111 and 113. As understood by those skilled in the art, each of the switches S1–S4 can be controlled using a control signal input to its gate. FIG. 3 provides timing waveforms for the switches to generate an output AC voltage waveform Vout (also shown in FIG. 3) across the capacitor 130 and the resistor 128.

A major drawback for various inverter circuits is that for loads having a capacitive component, a significant amount of power is dissipated as the load capacitance is charged and discharged during each half-cycle of the AC waveform. Part of this power is absorbed by the inverter circuit switches, which generates heat and causes temperature rises in those switches. To dissipate the heat, the switches are mounted on relatively large heat sinks. According to a known method, to better manage the heat dissipation, the inverter circuit is designed around a safe operating maximum capacitive load. However, in the event that a capacitive load greater than the specified load is applied to the inverter circuit, the heat generated by the switches may be greater than the heat dissipated. As a result, excessive heat causes components in the inverter circuit and in particular the switches to get hotter and hotter and eventually, the switches fail. Accordingly, a method and apparatus is required to overcome the shortcomings of above and other shortcomings.

SUMMARY OF THE INVENTION

One aspect of the invention is directed to an uninterruptible power supply for providing AC power to a load having a first capacitive element. The uninterruptible power supply includes an input to receive AC power from an AC power source, an output that provides AC power, a DC voltage source that provides DC power, the DC voltage source having an energy storage device, and an inverter operatively coupled to file DC voltage source to receive DC power and to provide AC power. The inverter includes first and second output nodes to provide AC power to the load having the first capacitive element, first and second input nodes to receive DC power from the DC voltage source, a circuit operatively coupled to the first output node of the inverter, the circuit being configured to compare a value representative of load capacitance of the first capacitive element with a reference value to determine excessive load capacitance, a set of switches operatively coupled between the first and second output nodes and the first and second input nodes and controlled to generate AC power from the DC power. The power supply further includes a transfer switch constructed and arranged to select one of the AC power source and the DC voltage source as an output power source for the uninterruptible power supply.

A second aspect of the invention is directed to an uninterruptible power supply for providing AC power to a load having a first capacitive element. The uninterruptible power supply includes an input to receive AC power from an AC power source, an output that provides AC power, a DC voltage source that provides DC power, the DC voltage source having an energy storage device, and an inverter operatively coupled to the DC voltage source to receive DC power and to provide AC power. The inverter includes first and second output nodes to provide AC power to the load having the first capacitive element, first and second input nodes to receive DC power from the DC voltage source, means for comparing a value representative of load capacitance of the first capacitive element with a reference value to determine excessive load capacitance, a set of switches operatively coupled between the first and second output nodes and the first and second input nodes and controlled to generate AC power from the DC power. The power supply further includes a transfer switch constructed and arranged to select one of the AC power source and the DC voltage source as an output power source for the uninterruptible power supply.

BRIEF DESCRIPTION OF THE DRAWINGS

For a better understanding of the present invention, reference is made to the drawings which are incorporated herein by reference and in which.

DETAILED DESCRIPTION

Figure 1:
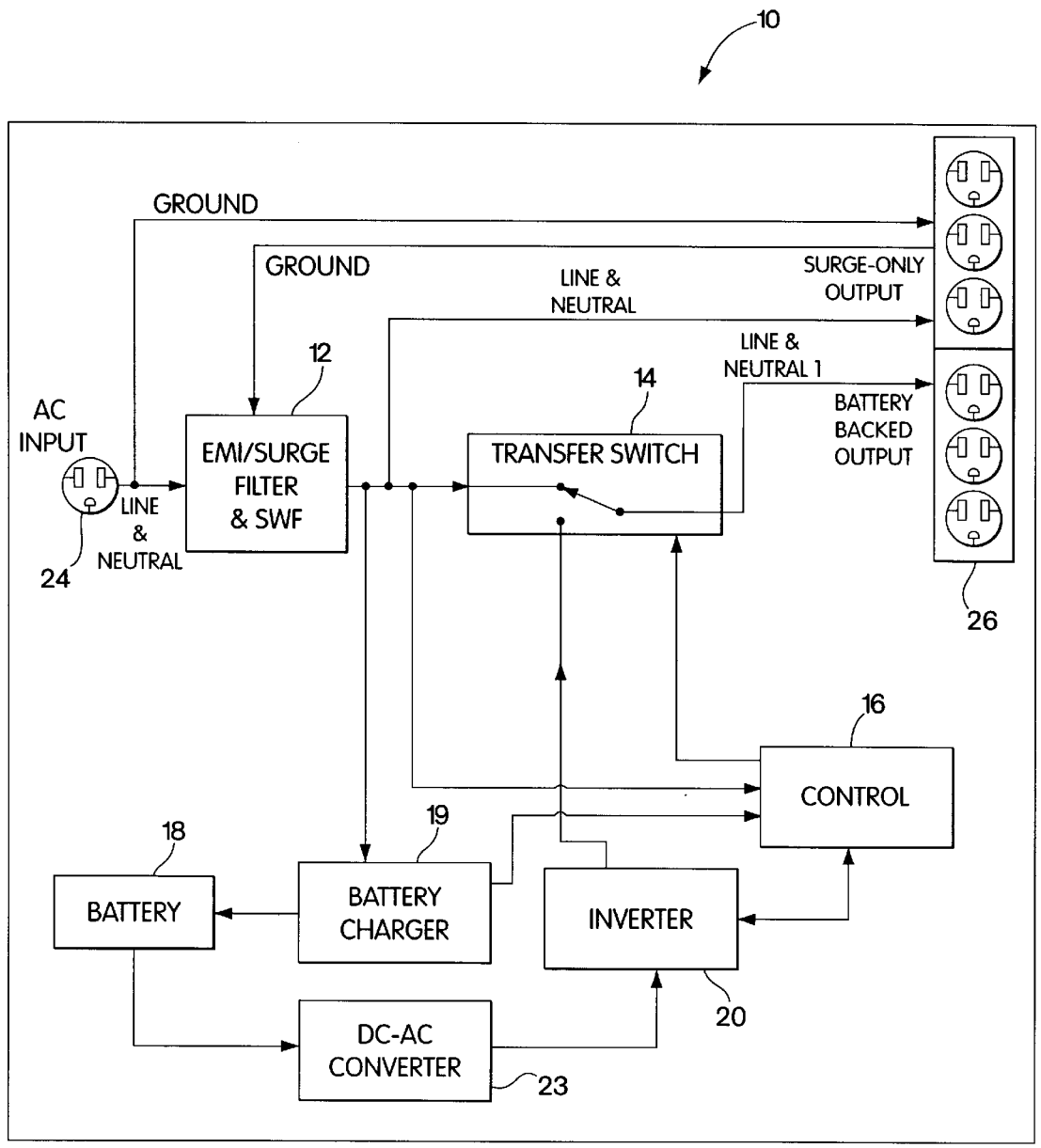
FIG. 1 is a block diagram of a typical uninterruptible power supply.
Figure 2:
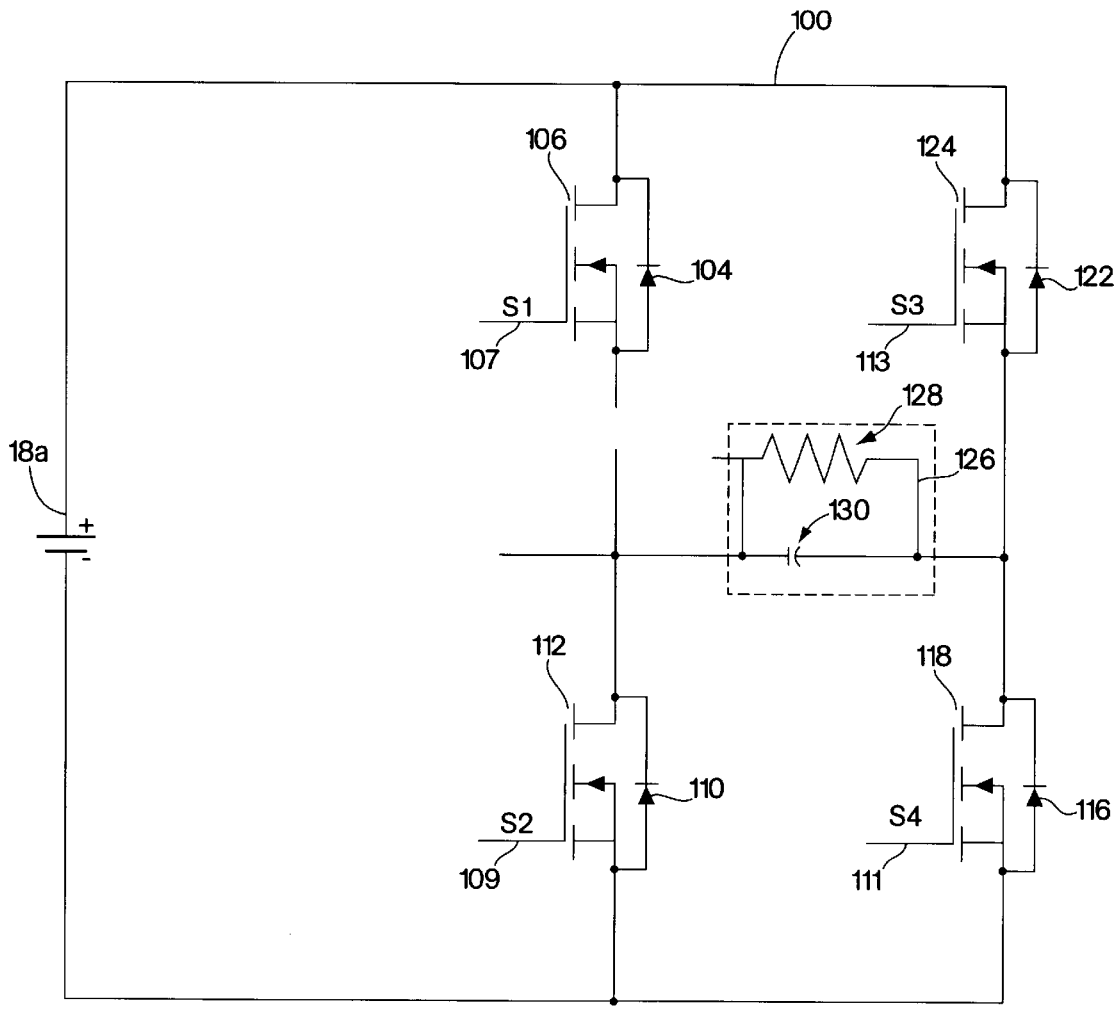
FIG. 2 shows a schematic diagram of a typical prior art inverter circuit.
Figure 2A:
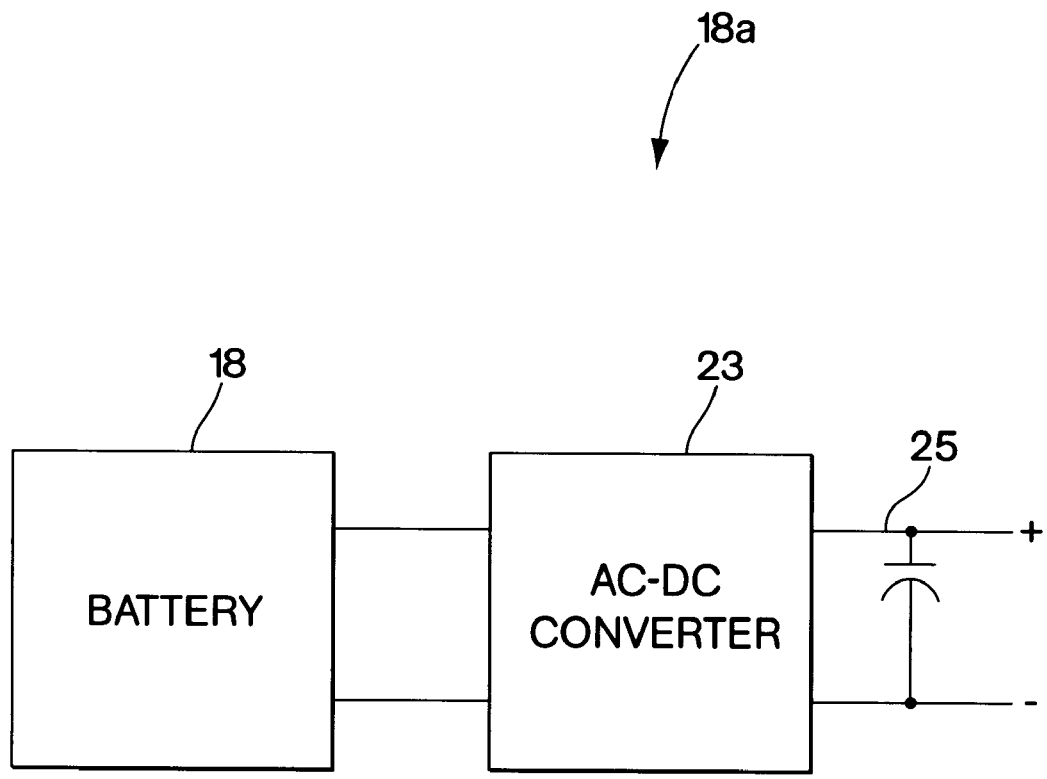
FIG. 2A shows a block diagram of a voltage source used with the inverter circuit of FIG. 2.
Figure 3:
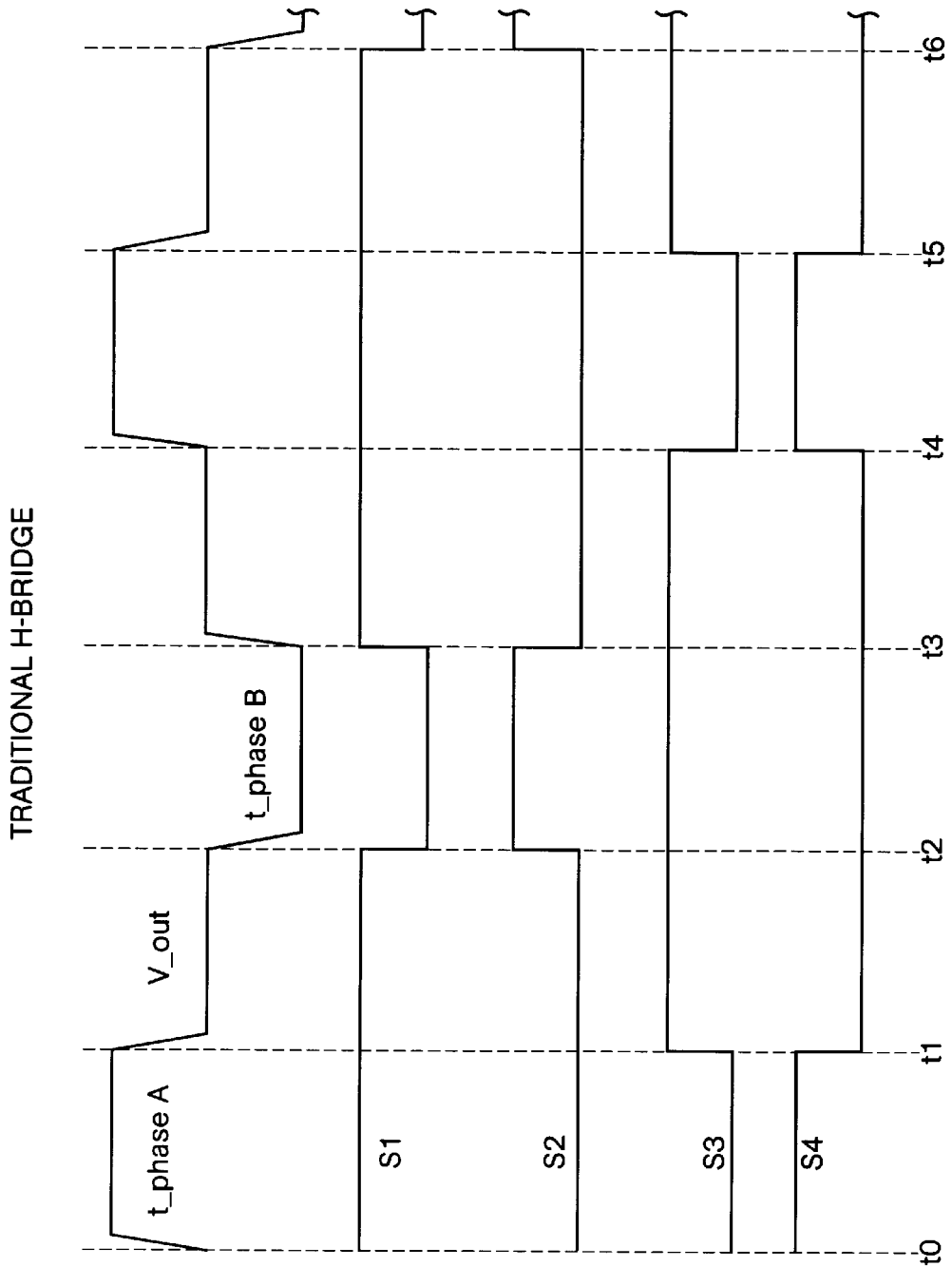
FIG. 3 shows timing waveforms for the inverter circuit shown in FIG. 2.

One embodiment of an inverter 200 in accordance with the present invention that may be used in the UPS of FIG. 1 will now be described with reference to FIG. 4 which shows a schematic diagram of the inverter 200 coupled to the voltage source 18a and the load 126. The inverter 200 includes MOSFET switches S1, S2, S3 and S4 of the prior art inverter 100 and includes two additional MOSFET switches S5 and S6 and an inductor 140. In one embodiment, the switches S5 and S6 are similar to switches S1–S4 and include a transistor 134, 138 having an intrinsic diode 132, 136. Each of the transistors 134 and 138 has a gate 115 and 117 that is used to control the state of the transistor.

In one embodiment that provides an output of 120 VAC, 400 VA, 25 amps peak current to the load from an input to the inverter of approximately 170 VDC, the switches S1–S6 are implemented using part no. IRF640 available from International Rectifier of E1 Segundo, Calif. For 220 VAC applications, the switches may be implemented using part no. IRF730 also available from International Rectifier. The inductor 140, in the 120 VAC embodiment, is implemented using a 1.8 mH inductor having a very high Bsat value to be able to withstand high peak currents without saturating. In one embodiment, the inductor is made from an E1 lamination structure of M-19, 18.5 mil steel having a large air gap between the E and I laminations. Other values of inductors may be used with embodiments of the present invention depending upon the peak switch current and physical size of the inductor desired. In selecting an inductor for use, the transition time, or time required to charge or discharge the load capacitance, should also be considered to prevent the transition time from becoming either too short or too long. If the transition time is too long, then the pulse width of the output waveform may become too long. If the transition time is too short, the peak switch currents become greater.

Figure 5:
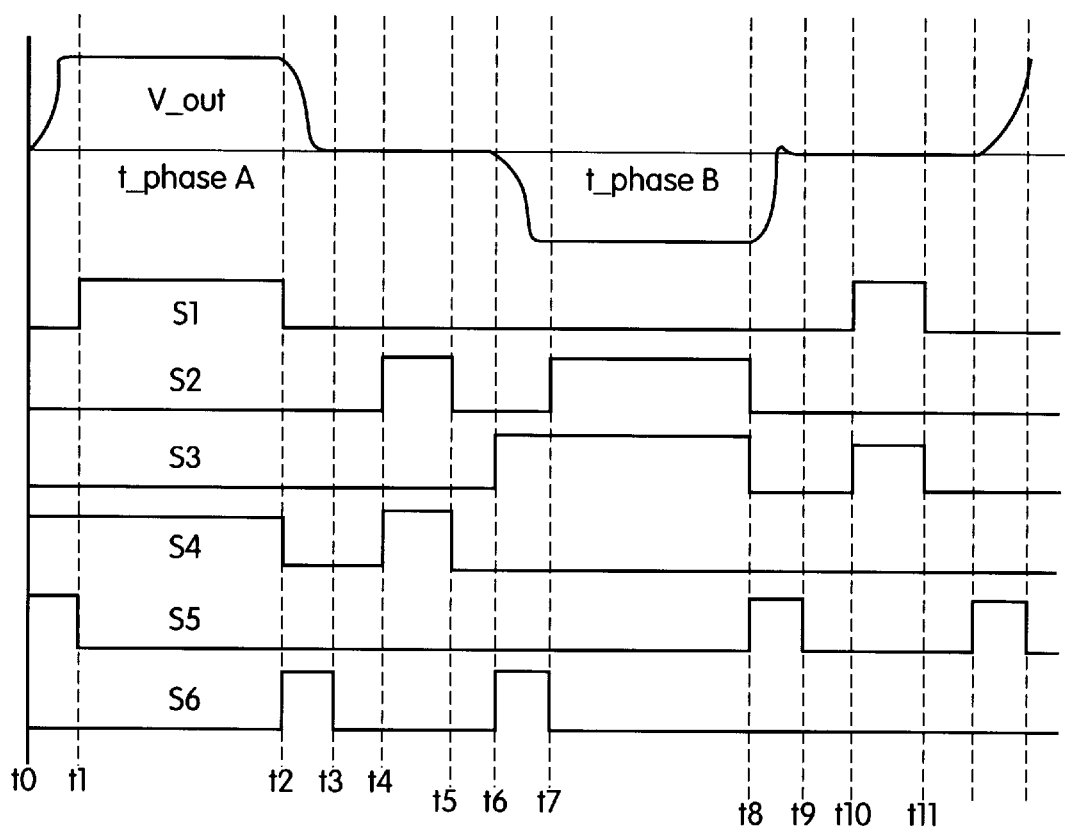
FIG. 5 shows timing waveforms for the inverter circuit shown in FIG. 4.

The operation of the inverter 200 to provide AC power to the load will now be described with reference to FIGS. 5–9. FIG. 5 provides a timing diagram of the operation of the switches S1–S6 of the inverter 200 and also provides the output voltage waveform across the load 126. In the timing diagram of FIG. 5, for each of the switches S1–S6, when the corresponding waveform is in the high state, the switch is turned on (conducting state) and when the corresponding waveform is in the low state the switch is turned off (non-conducting state).

In the inverter 200, the switches are shown as being implemented using NMOS devices. As known by those skilled in the art, for an NMOS device, a control signal having a high state is supplied to the gate of the device to turn the device on (conducting), while a control signal having a low state is supplied to the gate to turn the device off (non-conducting). Accordingly, the timing diagram of each of the switches also represents the state of the control signal provided to the gate of the corresponding transistor. In embodiments of the present invention, the control signals may be provided from, for example, controller 16 of the UPS of FIG. 1 when the inverter is used in a UPS. Alternatively, the control signals may be supplied using timing logic circuits residing within the inverter itself as is known in the art.

Figure 6:
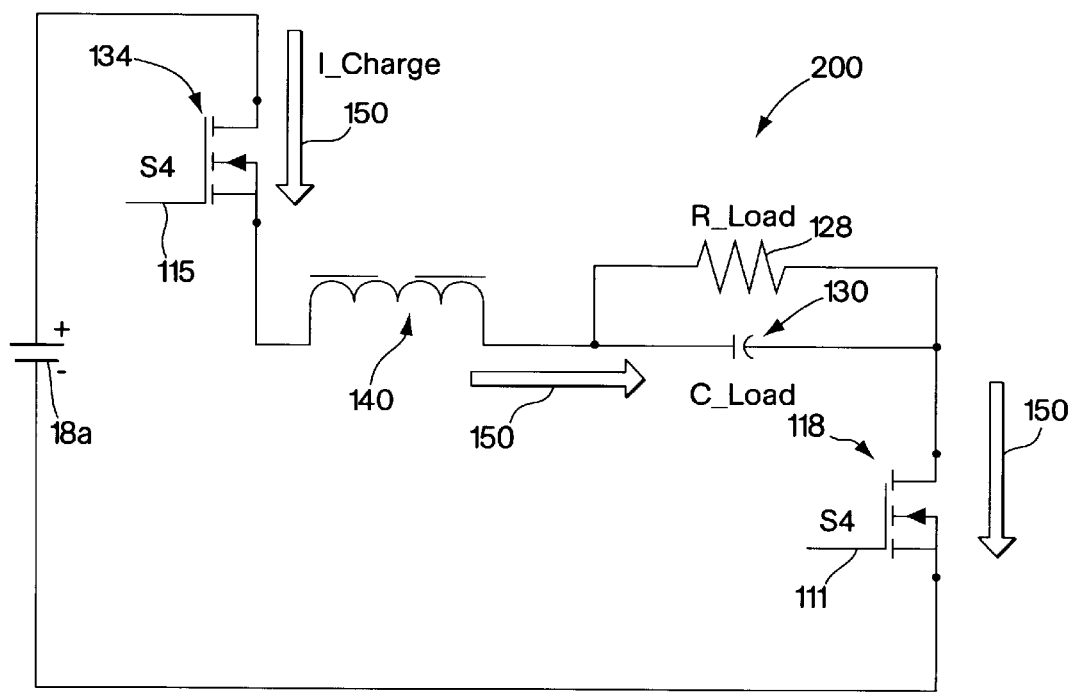
FIG. 6 illustrates a current path through the inverter of FIG. 4 during a charging mode of the inverter corresponding to a starting point of the positive half cycle of the output voltage waveform.

During a first time period from t0 to t1 in FIG. 5, switches S4 and S5 are turned on and switches S1, S2, S3 and S6 are turned off creating a current path through the inverter 200 in the direction of arrows 150 as shown in FIG. 6. Only the components of the inverter 200 in the current path created during the first time period are shown in FIG. 6. As shown in FIG. 6, with switches S4 and S5 turned on, the inductor 140 and the load 126 are connected in series across the voltage source 18a. During the first period, the output voltage across the load Vout rises in a resonant manner from zero volts to the voltage of the voltage source 18a. The output voltage Vout is prevented from rising beyond the voltage of the voltage source by the diode 104 (FIG. 7) of switch S1. The diode 104 will conduct current to limit the output voltage Vout to the voltage of the voltage source.

Figure 7:
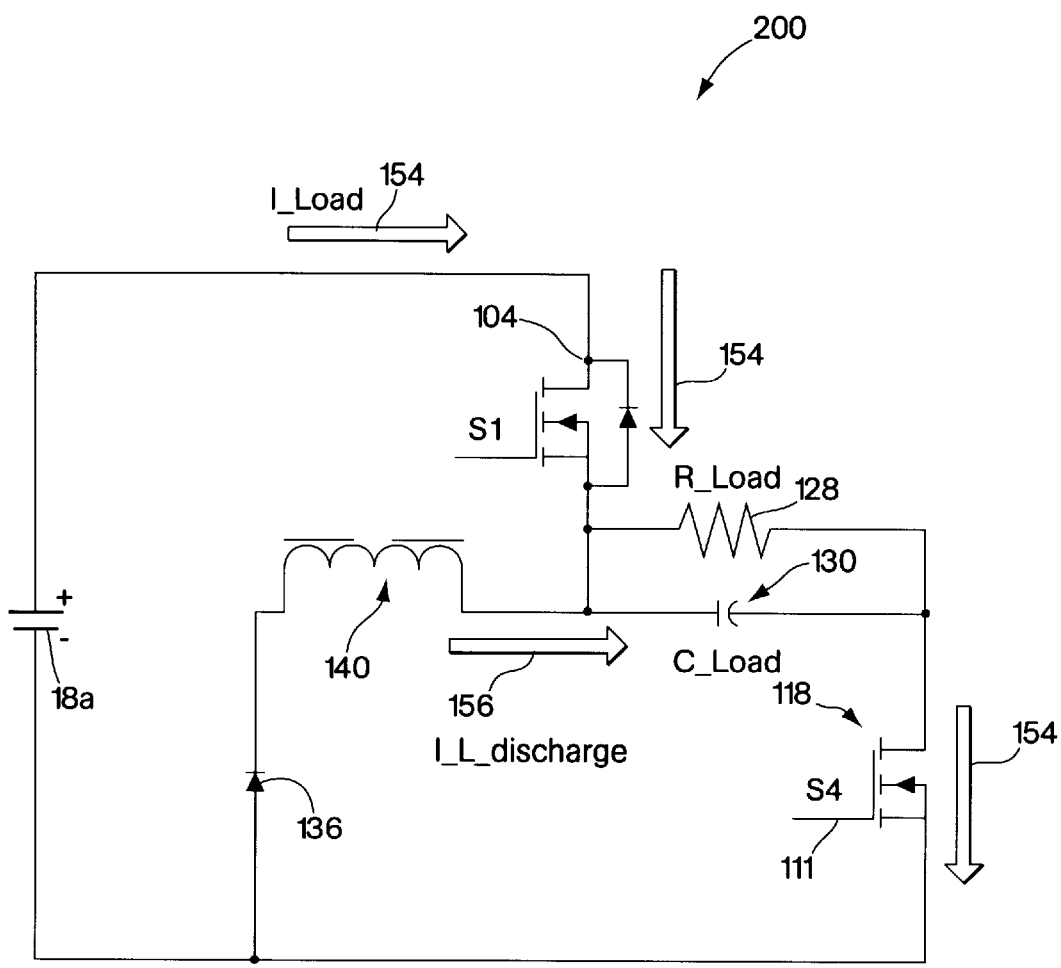
FIG. 7 illustrates a current path through the inverter of FIG. 4 during a positive half cycle of the output voltage waveform.

Once the output voltage Vout reaches the voltage of the voltage source (or shortly thereafter), at time t1, switch S1 is turned on and switch S5 is turned off. Switches S1 and S4 remain on for a second period from time t1 to time t2, during which time, the load is coupled across the voltage source 18a. FIG. 7 shows the current path through the inverter during the second time period. As shown in FIG. 7, load current during the second period follows arrows 154. Also during the second time period, the energy that was stored in the inductor during the first time period causes the voltage across the inductor to reverse and energy in the inductor is released to a storage device in the voltage source, such as a battery or a capacitor, through a current that follows a path along arrow 156 through diode 104 of switch 1 and diode 136 of switch 6. In addition, depending upon the load impedance, current from the energy stored in the inductor may also follow a path through the load.

Figure 8:
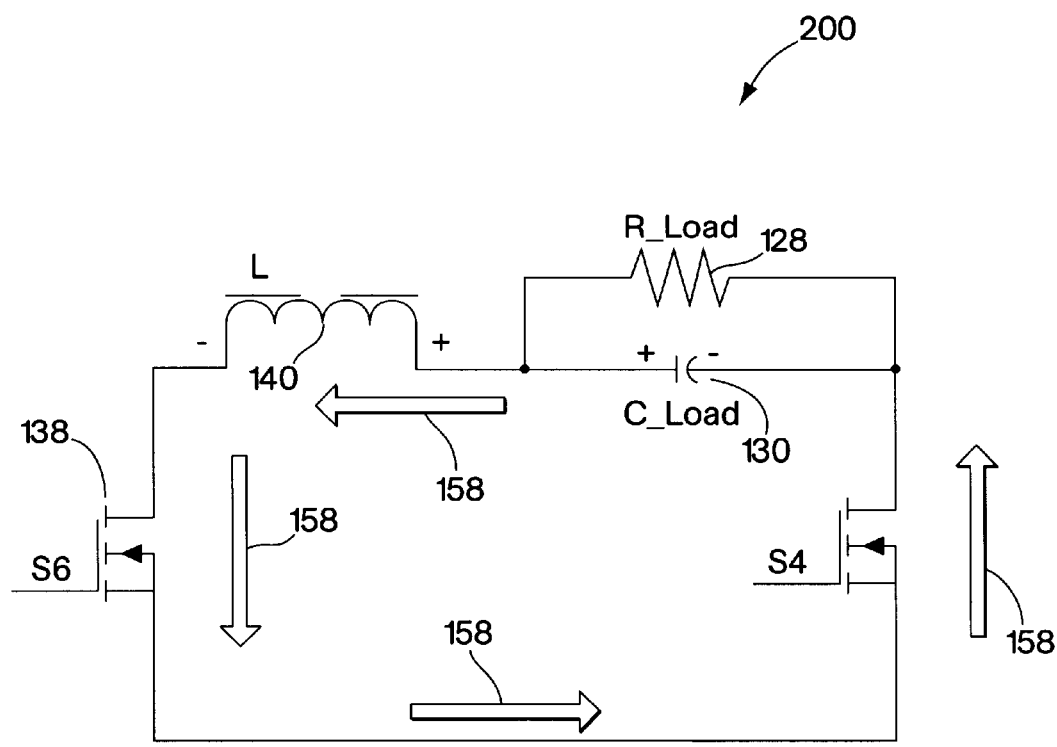
FIG. 8 illustrates a current path through the inverter of FIG. 4 during a discharging mode of the inverter at the end of the positive half cycle of the output voltage waveform.
Figure 9:
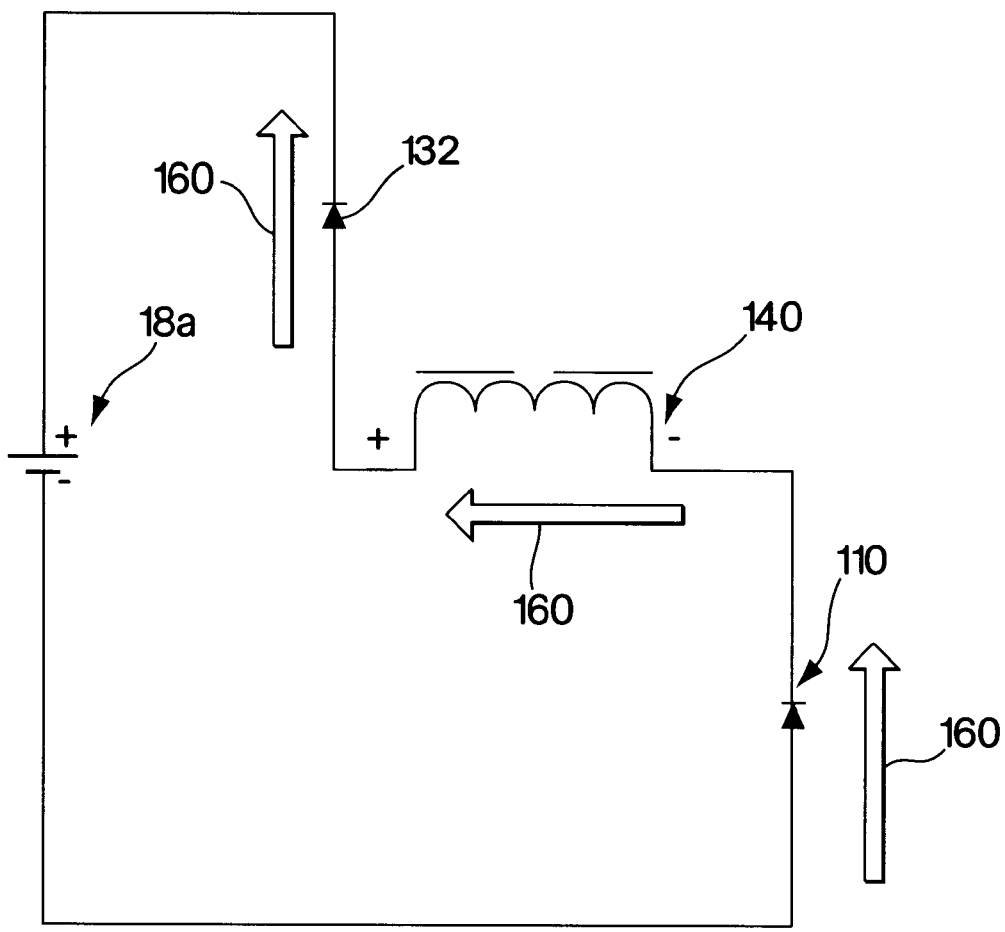
FIG. 9 illustrates a current path through the inverter during an energy recovery mode of the inverter.

During a third time period from time t2 to time t3, the voltage across the load is returned to zero. At time t2, switches S1 and S4 are turned off to disconnect the load from the voltage source and switch S6 is turned on to place the inductor effectively across the load as shown in FIG. 8. During the third time period, energy stored in the load capacitor 130 is transferred to the inductor 140, and the voltage across the load decreases to zero. The output voltage Vout is prevented from going negative by diode 110 (FIG. 9) of switch S2. The diode 110 will conduct current to limit the output voltage to zero.

At time t3 switch S6 is turned off, and all switches remain off during a fourth time period from t3 until t4. The current path through the inverter 200 during the fourth time period follows arrows 160 shown in FIG. 9. During the fourth time period, the energy in the inductor 140 freewheels into the voltage source 18a through diodes 110 and 132 of S2 and S5, and the voltage across the load typically remains at zero. The time from t3 until t4 is normally chosen to be long enough to permit all of the inductor energy to be transferred to the voltage source 18a.

During a fifth time period from t4 to t5, switches S2 and S4 are turned on to maintain a low impedance across the load to prevent any external energy from charging the output to a non-zero voltage. This is referred to as the "clamp" period. At time t5, all switches are again turned off and remain off for a sixth time period until time t6.

Beginning at time t6, and continuing until time t9 the negative half cycle of the AC waveform is created. The negative half cycle is created in substantially the same manner as the positive half cycle described above, except that switch S3 is substituted for switch S4, switch S6 is substituted for S5 and switch S2 is substituted for S1. The positive and negative half cycles then continue to be generated in an alternating manner to create an AC output voltage waveform.

As described above, excessive heating may occur when the load capacitor 130 is greater than the design specification. This may occur as follows. Using a positive half cycle as an example, prior to the clamp period that occurs during the fifth time period from t4 to t5, switch S6 is turned on at the third time period from t2 to t3 to place the inductor effectively across the load (see FIG. 8). The load capacitor 130 transfers its energy to the inductor 140 including switch S6 and the drain diode of S4. If the third time period is greater than the time needed for the resonant discharge, then the voltage at the drain of S2 will be at a diode drop below ground when the clamp period begins. The time it takes to discharge the load capacitor and for S2 drain to reach 0 V is ideally ¼ of the resonant period formed by the load capacitor 130 and inductor 140. This equals to $(1/4)*2*\pi*SQRT(L*C)$. For a third time period of 120 us and inductor 140 of nominal 2 mH, the max value of load capacitor 130 that results in a S2 drain of 0 volts is 2.9 uF. If the load capacitor 130 exceeds the maximum design value then the load capacitor 130 remains partially charged when the clamp period occurs. A surge of discharge current at the start of the clamp period results and the clamping switches S2 and S4 absorb the excessive capacitor energy resulting in heat being generated. Should the switches S2 and S4 continuously absorb the capacitor energy over many cycles, the resulting temperature rise may destroy switches S2 and S4.

Figure 10:
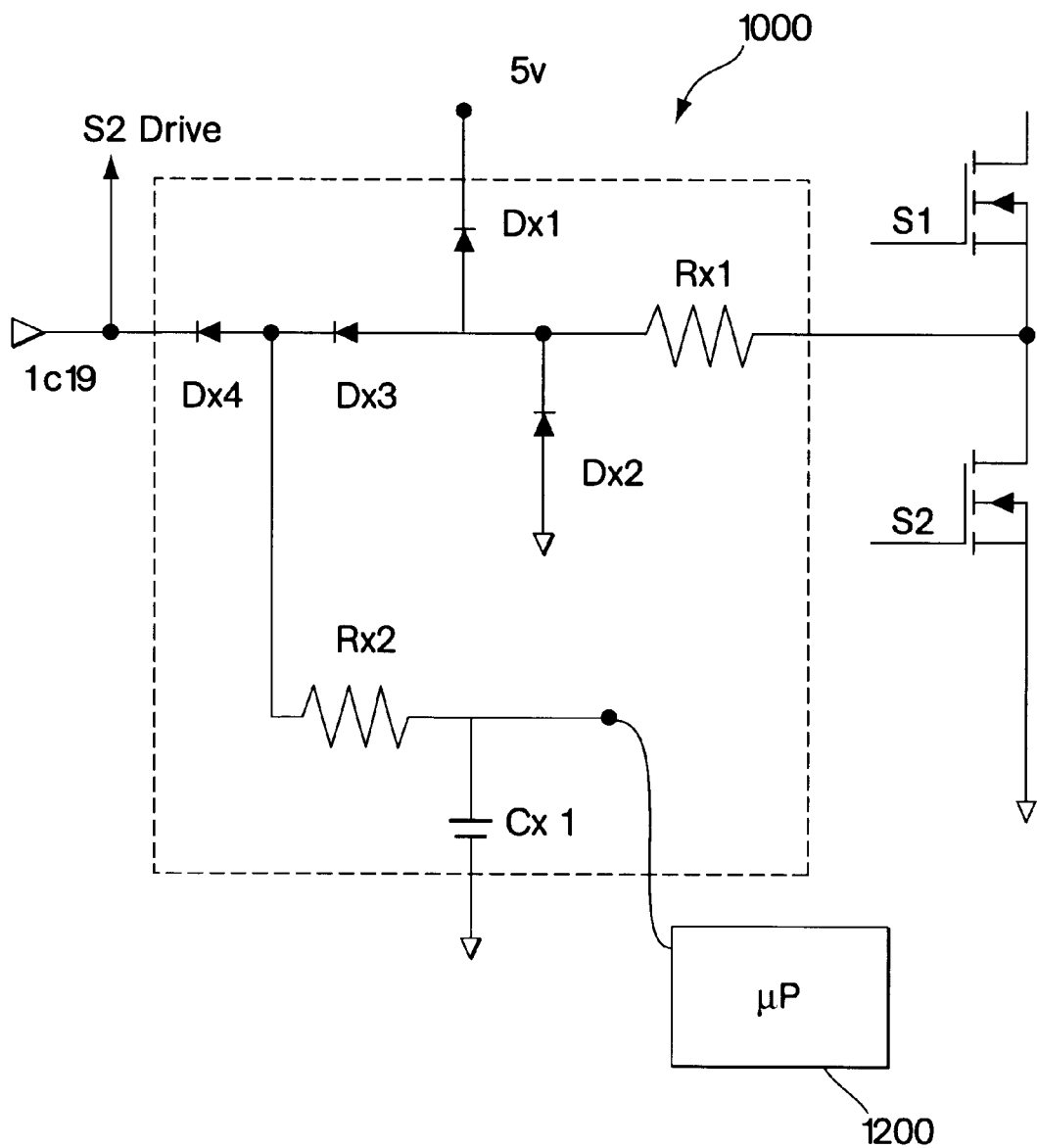
FIG. 10 illustrates an exemplary excessive load capacitance detector circuit according to an embodiment of the invention.

FIG. 10 illustrates an excessive load capacitance (x-cap) detector circuit 1000 that is used in one embodiment of the present invention to detect excessive load capacitance in an inverter circuit implementing the timing sequences illustrated in FIG. 5. The circuit functions as a peak detector that looks at the drain voltage of switch S2 when switches S2 and S4 are turned on during the clamp period. The circuit detects when the load capacitor 130 exceeds a maximum design value that leads to excessive heating of switches S1–S4. The x-cap detector circuit produces an analog value that is proportional to the excessive load capacitance, which is conveyed to an analog/digital (A/D) input of a microprocessor (uP) 1200. The uP 1200 determines if the load capacitance is too high and if so, the uP 1200 causes the UPS to be shut down to protect it from damage. Because the heating of the switches S1–S4 and their failure may not be immediate, the uP 1200 may be programmed to ride through several cycles of excessive load capacitance readings before a shutdown is initiated. As an alternative embodiment to an A/D input, the output of the detection circuit may be connected to other hardware that effectuates a shutdown.

The x-cap detector circuit comprises a resistor RX1 that has one end coupled to the drain of the switch S2 of the UPS 10 (see FIG. 1). The other end of the resistor RX1 is coupled to two diodes DX3 and DX4 coupled in series in which the output of diode DX4 is coupled to the switch S2 driver IC 19. The resistor RX1 is also coupled to two clamping diodes DX1 and DX2. A resistor RX2 has one end coupled to the output of diode DX3 and the other end coupled to a capacitor CX1. The x-cap detector circuit operates as follows. During the third time period the control signal to drive switch S2 is off, therefore the S2 driver IC 19 is low and the detection voltage on capacitor CX1 is held low through diode DX4 and resistor RX2. When the third time period ends, and the clamping period starts, the S2 driver IC 19 goes high (e.g., 12 V), which back biases diode DX4. At that time a voltage, if any, on the drain of switch S2 is captured by capacitor CX1 via resistor RX1, diode DX3 and resistor RX2. Thus, at the time t4 of clamping period, if there is a discharge current, switch Q2 comes out of saturation and the resulting drain voltage at switch S2 is captured on capacitor CX1. When the discharge is complete the drain voltage will be zero, however diode DX3 prevents capacitor CX1 from discharging. The uP samples the capacitor CX1 voltage and a decision is made on whether the inverter circuit should be shutdown to protect against excessive load capacitance. Diode DX1 and diode DX2, for example, clamp the voltage between 5 volts and ground. Until these clamp diodes conduct the response of the detection circuit is governed by the time constant (RX1+RX2)*CX1. IF RX1 is 100 Kohms, RX2 is 10 Kohms and capacitor CX1 is 470 pF, the time constant is 52 us. However once the 5 V clamp conducts the effective time constant is 4.7 us. The net effect is that low amplitude short duration drain voltage transients are rejected while high amplitude drain transients indicative of high capacitive loads are captured.

Figure 11:
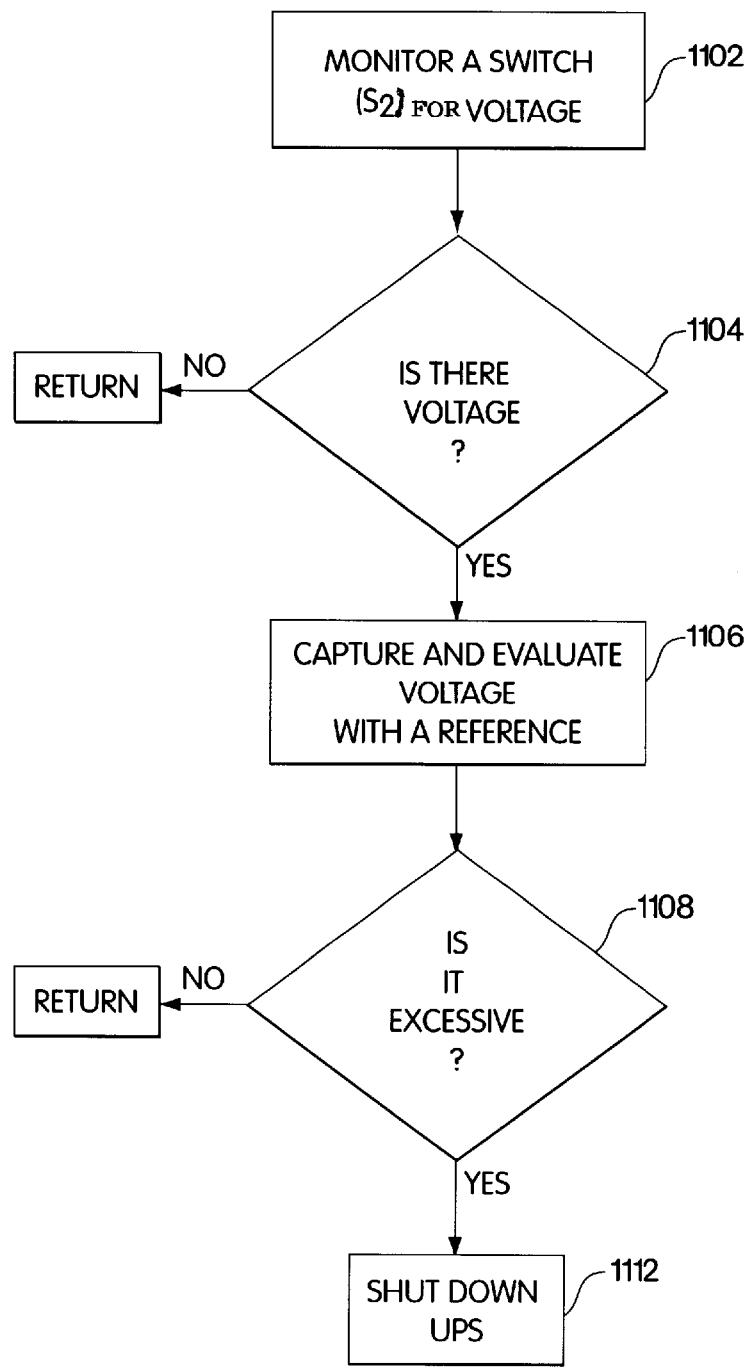
FIG. 11 is a flow diagram of an operation of an exemplary excessive load capacitance detector circuit.

FIG. 11 is a flow diagram that illustrates an operation of the exemplary x-cap detector circuit. In stage 1102, a drain of a clamping switch is monitored to determine if there is presence of a voltage (stage 1104). In stage 1106, if there is a voltage present, it is captured to be evaluated against a reference to determine if the voltage is excessive. In stage 1108, if the voltage is excessive in comparison with a reference, this indicates that there is excessive load capacitance driven by the UPS and the UPS is shut down to prevent damage to the UPS (stage 1112).

Figure 4:
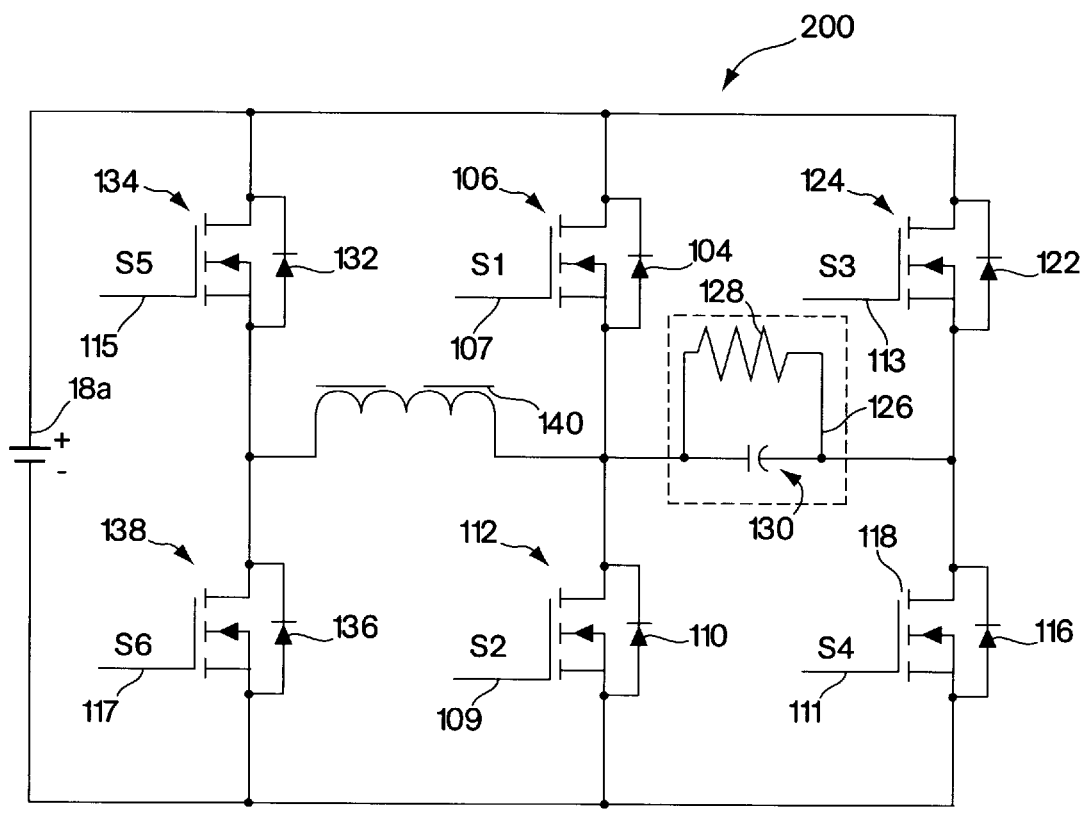
FIG. 4 shows a schematic diagram of an inverter circuit in accordance with one embodiment of the present invention.
Figure 12:
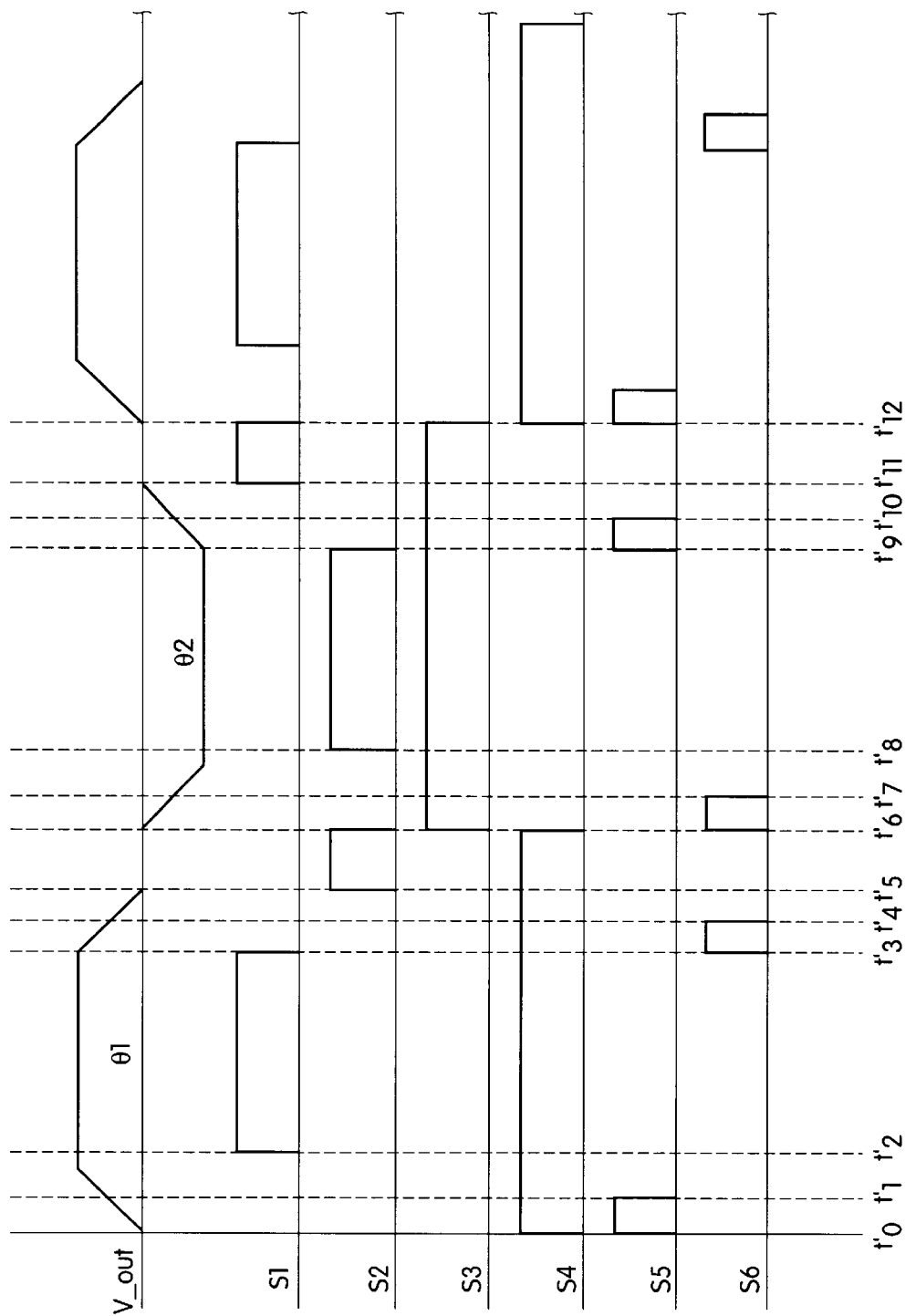
FIG. 12 illustrates alternative timing waveforms for the inverter circuit in FIG. 4.

The inverter circuit of FIG. 4 may use alternative timing sequences such as that illustrated in FIG. 12. With reference to FIG. 12, during a first time period from t'0 to t'1, switches S4 and S5 are turned on and switches S1, S2, S3 and S6 are turned off creating a current path through the inverter 200 in the direction of arrows 150 similar to that shown in FIG. 6. With switches S4 and S5 turned on, the inductor 140 and the load 126 are connected in series across the voltage source 18a. During the first time period, the load voltage Vout rises in a resonant manner from zero volts to a portion of the voltage of the voltage source 18a, preferably, approximately half of the voltage of the voltage source 18a. At time t'1, switch S5 turns off blocking the current path from the voltage source 18a to the inductor 140. During the second time period from t'1 to t'2, the current in inductor 140 freewheels through diode 136 and the energy stored in the inductor continues to charge the capacitor and increase the load voltage Vout to the voltage of the source voltage 18a. Accordingly, the power loss due to the inductor's stored energy being freewheeled into the bus capacitance is minimized. According to one embodiment, the controller 16 controls appropriate switches such that freewheeling or "swing" time is made approximately equal to the inductor charge time. For example, if the inductor charge time is 100 us the inductor freewheeling time is set at about 100 us. The output voltage Vout is prevented from rising beyond the voltage of the voltage source by the diode 104 (FIG. 7) of switch S1.

Once the load voltage Vout reaches the voltage of the source voltage (or shortly thereafter), at time t'2, switch S1 turns on and switches S1 and S4 remain on for a third time period from t'2 to t'3, during which time, the load is coupled across the source voltage 18a similar to that shown in FIG. 7. At time t'3, switch S1 turns off to disconnect the load from the voltage source 18a and switch S6 turns on to place the inductor effectively across the load similar to that shown in FIG. 8. During a fourth time period from t'3 to t'4, some of the energy stored in the load capacitor 130 is transferred to the inductor 140 and the voltage across the load decreases to approximately half the voltage source 18a, at which time t'4, the switch S6 is turned off. During the fifth time period from t'4 to t'5, with the switch S6 turned off, the inductor 140 freewheels its stored energy through diode 132 and is returned to the voltage source 18a in a manner similar to that shown in FIG. 9 and finishes discharging the load capacitor to zero volts. The output voltage Vout is prevented from going negative by diode 110 (FIG. 9) of switch S2. The diode 110 will conduct current to limit the output voltage to zero.

During a sixth time period from t'5 to t'6, switch S2 turns on and switches S2 and S4 maintain a low impedance across the load to prevent any external energy from charging the output to a non-zero voltage. This is referred to as the "clamp" period. At time t'6, all switches are turned off.

Beginning at time t'6 and continuing until time t'12, the negative half cycle of the AC waveform is created. The negative half cycle is created in substantially the same manner as the positive half cycle described above, except that switch S3 is substituted for switch S4, switch S6 is substituted for S5 and switch S2 is substituted for S1. The positive and negative half cycles then continue to be generated in an alternating manner to create an AC output voltage waveform. In this embodiment, the negative half cycle of the waveform is symmetric with the positive half cycle, and accordingly, the rise time, fall time and duration of the negative half cycle are approximately equal to those of the positive half cycle.

Figure 13:
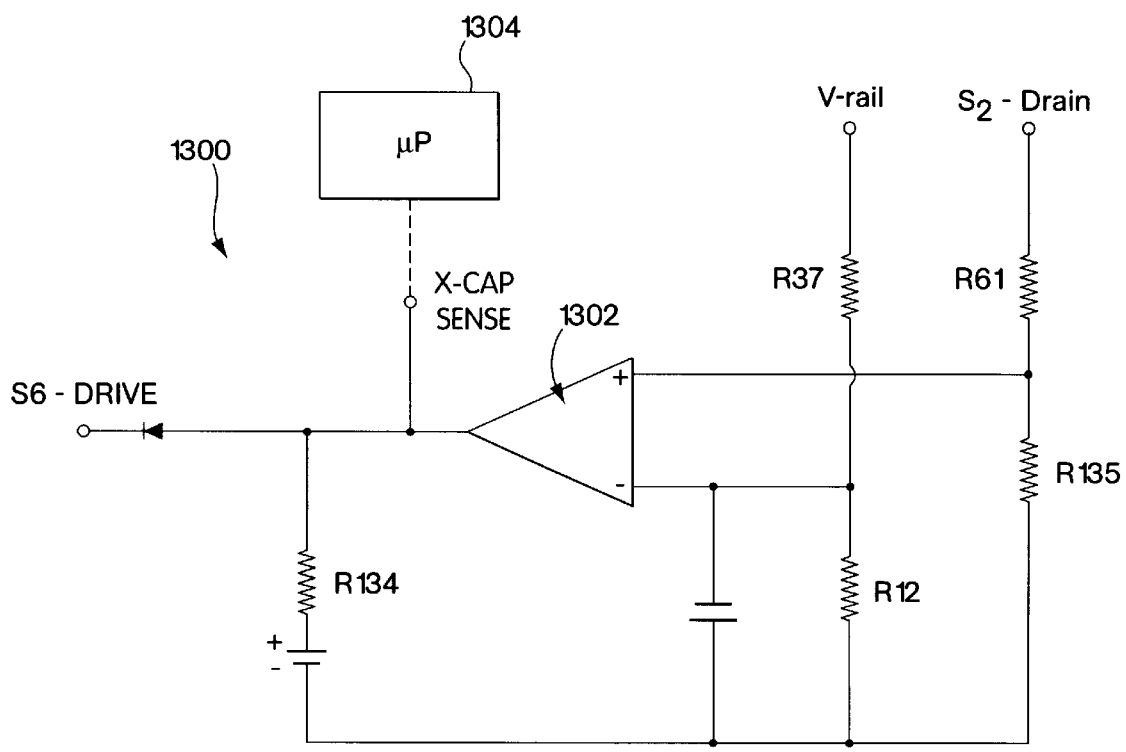
FIG. 13 illustrates another exemplary excessive load capacitance detector circuit according to an embodiment of the invention.

FIG. 13 shows a x-cap detector circuit 1300 in accordance with another embodiment of the present invention that may be used to detect excessive load capacitance in the alternative timing sequence described immediately above. The x-cap detector circuit 1300 provides an output signal having a pulse width that is proportional to the load capacitance. The length of the pulse, for example, can be measured by a microprocessor (uP) as is described. If the duration of the pulse exceeds a determined value then the amount of capacitance loading is deemed excessive and protective measures are taken by the uP, such as shutting down the UPS.

The principle of detecting excessive load capacitance in the alternative timing sequence is as follows. In one embodiment, detection of excessive load capacitance begins at each beginning of an end of a positive half cycle (i.e., fourth time period from t'3 to t'4). At time t'3 switch S1 turns off to disconnect the load from the voltage source 18a and switch S6 turns on to place the inductor 130 across the load. This causes a resonant transition of load capacitor 130 that discharges into the inductor 140, which defines a voltage waveform S2_Drain at the drain of switch S2. In essence, the discharge of the load capacitor 130 may be detected at the drain of switch S2. The timing of the waveform is defined by the resonant inductor value and the load capacitor value. At the maximum load capacitor design value, the voltage S2-Drain reaches a predetermined value (such as half of the voltage of the voltage source 18a) at which time switch S6 is turned off. The load capacitor 130 further discharges into inductor 140 that in turn freewheels its energy to the voltage source via the drain diode of switch S5 (current path similar to FIG. 9). If the load capacitor is smaller than the design value then the voltage S2-Drain transitions through greater than the half of the voltage rail at the time the switch S6 is turned off. Conversely, if the load capacitor is greater than design value, then the voltage S2-Drain transitions through less than half the voltage rail at the time the switch S6 is turned off. In embodiments of the present invention the time it takes for voltage S2-Drain to transition through a defined fraction of the voltage rail, in this example half the voltage rail is used to determine whether the load capacitor is excessive.

With that principle in mind, the x-cap detector circuit 1300 includes a comparator 1302. Inputs to the comparator 1302 are voltage V_Rail, the voltage across the voltage rail, and voltage S2 Drain, the voltage on the drain of switch S2. The circuit 1300 outputs a voltage xcap_sense. The voltage V Rail and voltage S2 Drain are scaled by resistors R37, R12, R61 and R135. The voltage V_Rail to voltage S2_Drain ratio for detection is set by the ratios of these resistor dividers, which in one embodiment is 13/20 (for example, R37=996 Kohms, R12=13 Kohms, R61=996

Kohms and R135=20 Kohms). When the voltage S2_Drain falls to or beyond 13/20ths of the voltage V_Rail the comparator 1302 output changes state from logic high to logic low. The signal S6_Drive, which is the control signal for switch S6, is diode Ored in with the comparator 1302 output. The signal S6_Drive remains low until driven high by a control logic which starts the falling resonant transition defined by fourth time period from t'3 to t'4. This turns on switch S6. This also causes the rising edge of xcap-sense which indicates to a uP 1304 to start a timer used to detect an overload. When the voltage S2_Drain falls to or beyond 13/20ths of the voltage V_Rail the comparator 1302 output pulls xcap_sense low which indicates to the uP 1304 to stop the timer. If the duration of the timer exceeds a predetermined threshold then there is excessive load capacitance and appropriate action is taken such as causing the uP 1304 to shut down the UPS. Usually the uP 1304 allows several excessive load capacitance readings to occur before it causes the shutdown of the UPS. Because the output of the comparator 1302 is an open collector, resistor R134 is provided as a pull-up resistor.

In embodiments of the present invention described above, inverters are described as being used with uninterruptible power supplies, for example, in place of the inverter 20 in the UPS 10 of FIG. 1. As understood by those skilled in the art, inverters of the present invention may also be used with other types of uninterruptible power supplies. For example, the inverters may be used with UPSs in which an input AC voltage is converted to a DC voltage and one of the converted DC voltage and a DC voltage provided from a battery-powered DC voltage source is provided to an input of the inverter to create the AC output voltage of the UPS. In addition, as understood by those skilled in the art, inverters in accordance with embodiments of the present invention may also be used in systems and devices other than uninterruptible power supplies.

In the inverter 200 described above, MOSFET devices are used as the switches S1–S6. As understood by those skilled in the art, a number of other electrical or mechanical switches, such as IGBT's with integral rectifiers, or bipolar transistors having a diode across the C-E junction, may be used to provide the functionality of the switches. Further, in embodiments of the present invention, each of the switches S1–S6 need not be implemented using the same type of switch.

In embodiments of the invention discussed above, an inductor is used as a resonant element in inverter circuits. As understood by one skilled in the art, other devices having a complex impedance may be used in place of the inductor, however, it is desirable that any such device be primarily inductive in nature.

In the embodiments of the present invention described above, energy is returned from the inductor to the voltage source after the load capacitance has been discharged. As understood by those skilled in the art, the voltage source may include a battery that receives the energy from the inductor, or the voltage source may include a storage device other than a battery, such as a capacitor that receives the energy.

In embodiments described, the x-cap detector circuits may be modified to detect excessive load capacitor using any of the time periods when the output voltage transitions from zero to positive or negative output, or from positive or negative output to zero. For the embodiments of FIG. 5 the periods are t0 to t1, t2 to t3, t6 to t7 and t8 to t9. For the embodiment of FIG. 12 the time periods are t0 to t1, t3 to t4, t6 to t7 and t9 to t10. When using other time periods the voltage across S1, S3 or S4 is measured instead of S2.

In embodiments described above, inverter circuits using a resonant element have been used to aid in the understanding of the invention. However, the invention may be practiced in inverter circuits that do not have a resonant element in their circuit. In particular, it is noted that the invention pertains to circuits that detect excessive load capacitance in a load coupled to an inverter circuit. Thus, for example, in embodiments using x-cap circuit described above, inverter circuits are not restricted to resonant bridge inverter circuits but also include conventional four-switch H-bridge inverter circuits, among others.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. An uninterruptible power supply for providing AC power to a load having a first capacitive element, the uninterruptible power supply comprising:

an input to receive AC power from an AC power source;

an output that provides AC power;

a DC voltage source that provides DC power, the DC voltage source having an energy storage device;

an inverter operatively coupled to the DC voltage source to receive DC power and to provide AC power, the inverter including:

first and second output nodes to provide AC power to the load having the first capacitive element;

first and second input nodes to receive DC power from the DC voltage source;

a circuit operatively coupled to the first output node of the inverter, the circuit being configured to compare a value representative of load capacitance of the first capacitive element with a reference value to determine excessive load capacitance;

a set of switches operatively coupled between the first and second output nodes and the first and second input nodes and controlled to generate AC power from the DC power; and a transfer switch constructed and arranged to select one of the AC power source and the DC voltage source as an output power source for the uninterruptible power supply.

2. The uninterruptible power supply of claim 1, further comprising:

a resonant element having a first terminal and a second terminal, the second terminal being electrically coupled to the first output node of the inverter; and a switch from the set of switches operatively coupled between the first terminal of the resonant element and the second input node, wherein when the switch is selected, the switch couples the resonant element to the first capacitive element of the load.

3. The uninterruptible power supply of claim 1, wherein the circuit comprises:

a second capacitive element electrically coupled to the first output node to store a voltage of the first capacitive element; and a logic circuit to compare the stored voltage of the first capacitive element with a reference voltage to determine excessive load capacitance.

4. The uninterruptible power supply of claim 3, wherein the logic circuit includes a microprocessor.

5. The uninterruptible power supply of claim 3, wherein the circuit is configured to store the voltage of the first capactive element during a clamping operation of the inverter.

6. The uninterruptible power supply of claim 2, wherein the circuit comprises:

a comparator having a first input electrically coupled to receive a reference voltage value and a second input electrically coupled to receive a voltage value stored in the first capacitive element when the first switch is selected to coupled the first capacitive element to the resonant element, the comparator configured to continuously compare the first input value with the second input value, the comparator changing a logic state when the second input value exceeds the first input value; and a logic circuit to measure a time interval between a first time in which the comparator initiates comparison of the first input value with the second input value and a second time in which the second input value exceeds the first input value with a predetermined time interval, the logic circuit determining the load capacitance to be excessive when the time interval exceeds the predetermined time interval.

7. The uninterruptible power supply of claim 6, further comprising:

a first set of resistors coupled to the first input of the comparator to scale the reference voltage value; and a second set of resistors coupled to the second input of the comparator to scale the first capactive element voltage value, wherein a ratio of the first set of resistors and the second set of resistors determines the value of the second input value with respect to the first input value in which the comparator changes logic state.

8. The uninterruptible power supply of claim 6, wherein the reference voltage is the source voltage.

9. The uninterruptible power supply of claim 6, wherein the logic circuit is a microprocessor.

10. The uninterruptible power supply of claim 1, wherein the circuit is further configured to shutdown the uninterruptible power supply if the circuit determines the load capacitance is excessive.

11. An uninterruptible power supply for providing AC power to a load having a first capacitive element, the uninterruptible power supply comprising:

an input to receive AC power from an AC power source;

an output that provides AC power;

a DC voltage source that provides DC power, the DC voltage source having an energy storage device;

an inverter operatively coupled to the DC voltage source to receive DC power and to provide AC power, the inverter including:

first and second output nodes to provide AC power to the load having the first capacitive element;

first and second input nodes to receive DC power from the DC voltage source;

means for comparing a value representative of load capacitance of the first capacitive element with a reference value to determine excessive load capacitance;

a set of switches operatively coupled between the first and second output nodes and the first and second input nodes and controlled to generate AC power from the DC power; and a transfer switch constructed and arranged to select one of the AC power source and the DC voltage source as an output power source for the uninterruptible power supply.

12. The uninterruptible power supply of claim 10, further comprising:

a resonant element having a first terminal and a second terminal, the second terminal being electrically coupled to the first output node of the inverter; and a switch from the set of switches operatively coupled between the first terminal of the resonant element and the second input node, wherein when the switch is selected, the switch couples the resonant element to the first capacitive element of the load.

13. The uninterruptible power supply of claim 10, wherein the circuit comprises:

means for comparing including means for comparing the stored voltage of the first capacitive element with a reference voltage to determine excessive load capacitance.

14. The uninterruptible power supply of claim 13, wherein means for comparing includes meaning for shutting down the uninterruptible power if means for comparing determines that the load capacitance is excessive.

* * * * *